United States Patent [19]

Luepertz

[11] 4,350,228
[45] Sep. 21, 1982

[54] MECHANICAL ACTUATING DEVICE FOR A SPOT-TYPE DISC BRAKE

[75] Inventor: Hans-Henning Luepertz, Darmstadt, Fed. Rep. of Germany

[73] Assignee: ITT Industries, Inc., New York, N.Y.

[21] Appl. No.: 205,135

[22] Filed: Nov. 10, 1980

[30] Foreign Application Priority Data

Nov. 20, 1979 [DE] Fed. Rep. of Germany ....... 2946852

[51] Int. Cl.³ .............................................. F16D 65/56
[52] U.S. Cl. ............................. 188/71.9; 188/196 D
[58] Field of Search .......... 188/71.9, 196 BA, 196 D, 188/72.8; 192/111 A

[56] References Cited

U.S. PATENT DOCUMENTS

| 3,851,737 | 12/1974 | Hewins | 188/71.9 |
| 3,944,027 | 3/1976 | Yamamoto | 188/71.9 |
| 3,976,168 | 8/1976 | Yamamoto | 188/71.9 |
| 4,014,411 | 3/1977 | Troester | 188/71.9 |
| 4,031,985 | 6/1977 | Ito | 188/196 BA |
| 4,278,152 | 7/1981 | Tosi | 188/72.8 |

Primary Examiner—Edward R. Kazenske
Attorney, Agent, or Firm—John T. O'Halloran; Alfred C. Hill

[57] ABSTRACT

The actuating device comprises an actuating nut and spindle combination disposed in a brake piston, the spindle being rotated by an actuating lever and the nut having an outer thread engaging an inner thread of the brake piston thereby providing a brake pad clearance adjusting device. The brake piston is rotatably connected to the spindle via a one-way clutch for progressively screwing the brake piston out of the nut to compensate for brake pad wear. The one-way clutch is connected to the spindle by a rod extending through an axial bore in the spindle enabling the clutch to be unlocked from the outside of the actuating device for resetting the brake piston when worn brake shoes are being replaced.

27 Claims, 4 Drawing Figures

MECHANICAL ACTUATING DEVICE FOR A SPOT-TYPE DISC BRAKE

BACKGROUND OF THE INVENTION

The present invention relates to a mechanical actuating device for a spot-type disc brake comprising a brake caliper embracing a brake disc inwardly or outwardly, the brake caliper including at least one axial cylindrical bore for accommodating a substantially cylindrical hollow brake piston which acts on one brake shoe via an intermediate plate, if necessary, an actuating spindle arranged axially within the brake piston and adapted to be turned around its axis by means of an actuating means, the actuating spindle cooperating with an actuating nut likewise disposed in the brake piston and abutting with its outer surface at least partly the inner wall of the brake piston such that the brake piston is advanced upon a relative axial displacement between the actuating spindle and the actuating nut caused by the actuating spindle being turned, and an automatic adjusting device for the brake piston likewise disposed in the brake piston. The present invention refers in particular to a special design of a floating-caliper brake, i.e., to the so-called fist-type caliper brake, in which one single bridge embraces the brake disc in a fist-like manner.

In a known spot-type disc brake adapted to be actuated both hydraulically and mechanically, for example German Patent DE-AS No. 1,575,996, the brake piston is located axially freely movable on the actuating nut and, for actuation thereof, is acted upon from the inside by an adjusting spindle cooperating with the adjusting device. The known brake is constructed of a comparatively great number of components, and the actuating force is exerted on an end of the brake piston through a relatively small surface of the adjusting spindle. For the resetting of the adjusting device prior to a pad replacement due to pad wear, it is required to unscrew a screw cap and to take out a wedge, which is problematic in practice because of the danger of the wedge being jammed by corrosion, for example, and because such a small component gets easily lost. Construction and assembly of the known brake are also rather costly.

SUMMARY OF THE INVENTION

It is an object of the present invention to provide a mechanical actuating device for a spot-type disc brake, in particular for a fist-type caliper brake of the type referred to hereinabove, in which the hollow brake piston abuts the brake shoe directly, or through an intermediary member, at the furthest possible radially outward location, in which a good axial guidance of all axially adjustable components is guaranteed and in which, above all, a simple and unproblematic resetting of the adjusting device is possible before replacing warn brake shoes by new ones.

A feature of the present invention is the provision of a mechanical actuating device for a spot-type disc brake comprising a brake caliper embracing the periphery of a brake disc., one leg of the caliper having a cylindrical bore therein, the bore having a longitudinal axis parallel to an axis of rotation of the brake disc; a hollow cylindrical brake piston disposed in the cylindrical bore coaxial of the longitudinal axis, the brake piston being rotatable in the cylindrical bore, acting upon one brake shoe of the disc brake, and having a first thread disposed on the inner surface thereof; an actuating nut secured against rotation disposed within the brake piston coaxial of the longitudinal axis, the actuating nut having a second thread on at least a portion of its outer surface engaging the first thread; an actuating spindle disposed within the actuating nut coaxial of the longitudinal axis, the actuating spindle cooperating with the actuating nut to advance the brake piston toward the brake disc upon a relative axial displacement between the actuating spindle and the actuating nut caused by the actuating spindle being rotated by an actuating means coupled thereto; and an automatic brake pad clearance adjusting device disposed in the brake piston coaxial of the longitudinal axis including a one-way clutch disposed to act between the brake piston and the actuating spindle to enable maintaining a nominal brake pad clearance with respect to the brake disc by moving the brake piston out of the cylindrical bore when the actuating spindle is returning to its rest position after a brake actuation, the one-way clutch being connected to the actuating spindle during brake operation with this connection being capable of being removed to enable the one-way clutch to rotate independently of the actuating spindle.

In particular, the construction should be such that the outer surface of the actuating nut and the inner surface of the brake piston are provided with engaged adjusting threads and that the one-way clutch located between the actuating spindle and the brake piston, turnable within the bore, entrains the brake piston neither in the one nor in the opposite direction during its connection with the spindle locked with each other against rotational movement within a turning capacity of the actuating spindle corresponding to the nominal brake pad clearance. However, the one-way clutch will effect, after the nominal brake pad clearance is exceeded during a brake actuation, a relative rotation with respect to the actuating spindle, opposite to the actuating direction of rotation and corresponding to the amount the brake pad clearance has been exceeded, and causes the brake piston to rotate accordingly when the actuating spindle returns to its initial position.

Due to this construction, there are three constructional units located coaxially and very compactly with respect to each other, with the mechanical member, i.e., the brake piston, acting on the directly-actuated brake shoe, being located radially outward as far as possible so that a maximum abutment surface is provided at the backing plate of the directly-actuated brake shoe, or at an intermediate plate provided. The resetting may be carried out in a simple manner in that the the piston is turned back to its initial position either directly or via the one-way clutch after the one-way clutch and the actuating spindle are disconnected.

To provide a smallest possible amount of friction between the actuating spindle and the actuating nut, the thread between these two components is preferably a ball bearing thread with an internal ball guide return tube. The actuating spindle is supported preferably by an axial roller bearing or a needle bearing disposed between the end of the actuating spindle remote from the brake shoe and the closed end of the axial bore remote from the brake shoe.

The fitting or assembly of the brake in accordance with the present invention is very simple, too, since the three components arranged coaxially in each other are able to be assembled prior to the assembly and may then be simply inserted in the bore in the inboard leg of the fist-type caliper.

The one-way clutch is suitably located adjacent the inboard brake shoe and is advantageously provided with a radial nose engaging in a circumferential recess of the brake piston, the circumferential length of the recess corresponding to the nominal brake pad clearance.

A particularly advantageous construction of the one-way clutch includes an inner part connected with the actuating spindle locked to each other against rotational movement, and an outer part carrying the radial nose and capable of rotating relative to the inner part in the adjusting direction only. In this case, the inner part is preferably a disc located at the end surface of the actuating spindle adjacent to the inboard brake shoe, while the outer part is required to be a ring located turnably on the disc. A ball locking mechanism is suitably arranged between the disc and the ring. Thus, a one-way clutch is achieved which is very favorable with respect to the purposes of the present invention, since the one-way clutch is disposed at the end surface of the actuating spindle, thus, requiring little space and is composed of a small number of components. The inner part is advantageously clamped to the end surface of the actuating spindle locked to each other against rotational movement, while the outer part communicates with the piston via the radial nose.

To allow a simple actuation from the outside, the actuating spindle includes an axial bore through which an actuating rod for the one-way clutch extends from the outside to the one-way clutch. It is particularly favorable, if the actuating rod serves simultaneously to clamp the one-way clutch to the actuating spindle and to disconnect the one-way clutch from the spindle.

The clamping power required for clamping the one-way clutch to the actuating spindle operation is preferably obtained by a nut threaded onto the end of the actuating rod remote from the inboard brake shoe to exert an axial clamping power on the one-way clutch. The connection between the one-way clutch and the actuating spindle locked to each other against rotational movement is preferably established by a friction contact. In this case, both the inner part of the one-way clutch and the adjacent end surface of the actuating spindle may be constructed as a plane, which is favorable with regard to the manufacturing process and also to the space required.

To enable a resetting of the piston for brake pad replacement by the actuating rod, in a preferred embodiment, the inner part and the outer part of the one-way clutch are locked to each other against rotational movement also in the free-wheeling direction of rotation. The actuating rod is, on its part, required to be coupled with the inner part and locked to each other against rotational movement. If the coupling between the inner part and the outer part of the one-way clutch locked to each other against rotational movement is now established simultaneously with the coupling being established between the actuating rod and the inner part locked to each other against rotational movement, the piston is allowed to be turned in both directions, thus, in the sense of a resetting, by exerting a torque on the actuating rod.

A particularly advantageous construction is characterized in that a radial peg extending from the end area of the actuating rod engages a recess in the inner part, confined in the circumferential direction, and acts in the adjusting direction of rotation on a rotation-locking mechanism coupling the inner part with the outer part in the locking position. The rotation-locking mechanism is suitably equipped with a locking pin shiftable radially in the inner part, the locking pin being adapted to slide radially outwardly into a radial bore of the outer part against the force of a spring when the peg acts upon the apex of a cone carried by the locking pin.

The advantages of the present invention are that a high efficiency may be achieved with a minimum mounting space and that a wedge-shaped wear is largely avoided on account of the defined guidance of the annular brake piston in the caliper leg. The friction between the actuating spindle and actuating nut is kept to a low amount by using a ball bearing thread connection between the actuating spindle and the actuating nut with an internal ball guide return tube. Moreover, a direct force transmission is provided. The pressure surface of the piston on the brake shoe is comparatively large. The mounting of the relatively small number of parts is easily done. Likewise, the brake pad replacement can be carried out without any difficulty because the resetting of the brake piston may be performed simply by disconnecting the one-way clutch from the actuating spindle by means of a nut to be loosened and by the piston being turned preferably through the actuating rod.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
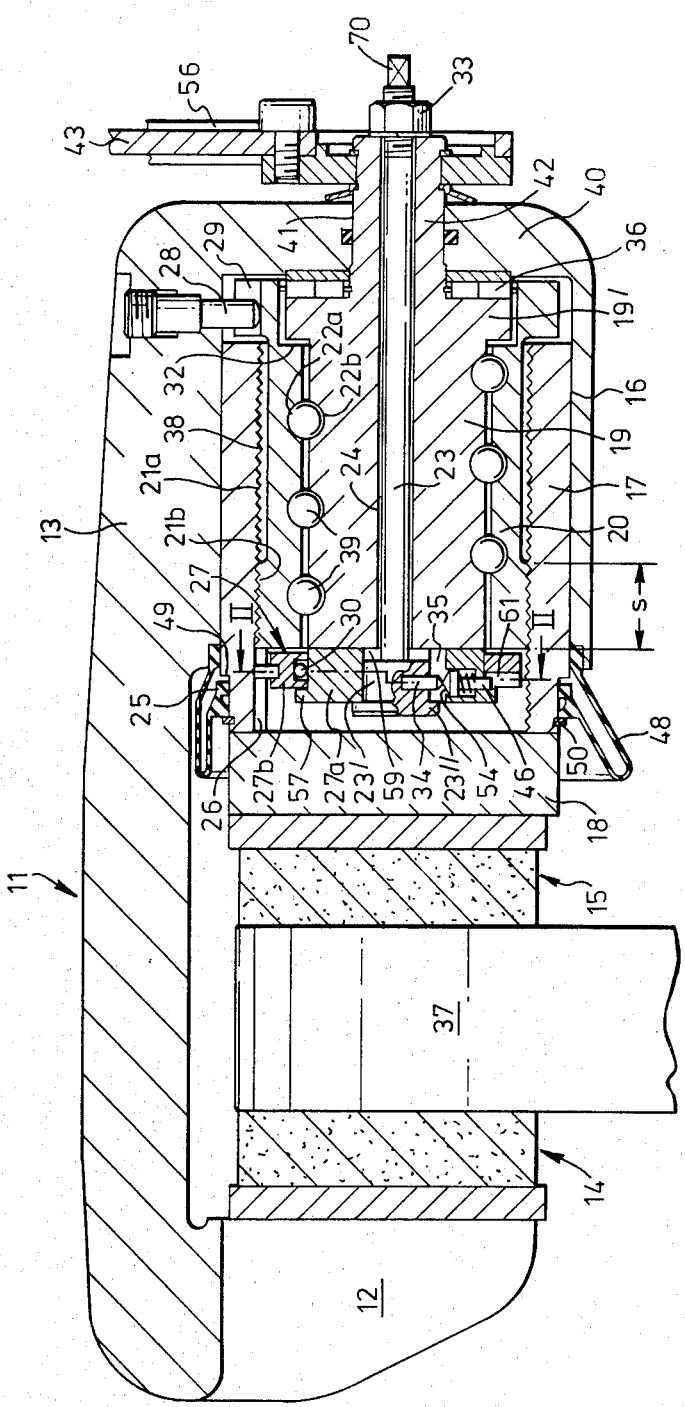
FIG. 1 is a longitudinal cross sectional view of a fist-type caliper brake in accordance with the principles of the present invention.

Referring to FIG. 1, a fist-type caliper 11 embraces axially the outer periphery of a brake disc 37. Outboard leg 12 carries outboard brake shoe 14 which is actuated indirectly by caliper 11. The inboard leg 13 of fist-type caliper 11 includes an axial bore 16, in which a cylindrical brake piston 17 is arranged movably. The annular end surface of brake piston 17 adjacent brake disc 37 acts on a large area of an intermediate plate 18 which is in direct communication with the inboard brake shoe 15.

Located on the inner wall of brake piston 17 is an adjusting thread 21a which cooperates with an adjusting thread 21b disposed on the outer surface of an actuating nut 20. While thread 21a extends over almost the entire length of brake piston 17, the external thread 21b is provided on actuating nut 20 along a comparatively short distance S at the end portion thereof adjacent brake disc 37. Along a majority of its length, the outer surface of actuating nut 20 is spaced radially from the inner surface of brake piston 17, this space being indicated in FIG. 1 by reference numeral 38.

Actuating nut 20 is likewise constructed annularly and includes on its inner surface a ball bearing thread 22a with balls 39 cooperating with an external ball bearing thread 22b on an actuating spindle 19 located coaxially inside of nut 20. The return guide tube (not shown)

for thread balls 39, lined up close to each other, is located inside actuating spindle 19 incorporating an axial bore 24.

Actuating spindle 19 has a radially projecting flange 19' at its end surface remote from brake disc 37. Flange 19' bears against the end wall 40 of bore 16 remote from brake disc 37 via an axial roller bearing or a needle bearing 36. Wall 40 includes centrally an axial bore or opening 41, through which an actuating pivot 42 of spindle 19 extends outwardly. Fastened at the end of actuating pivot 42 is an actuating lever 43 abutting a stop 56 in the brake's release position.

Actuating nut 20 projects outwardly up to the inner wall of bore 16 in the area of radial flange 19'. In order to provide for the space required therefor, brake piston 17 does not extend entirely up to wall 40 of bore 16.

Provided in the area of actuating nut 20 projecting radially up to bore 16 is a central recess 32 which houses flange 19' of actuating spindle 19.

Figure 2:
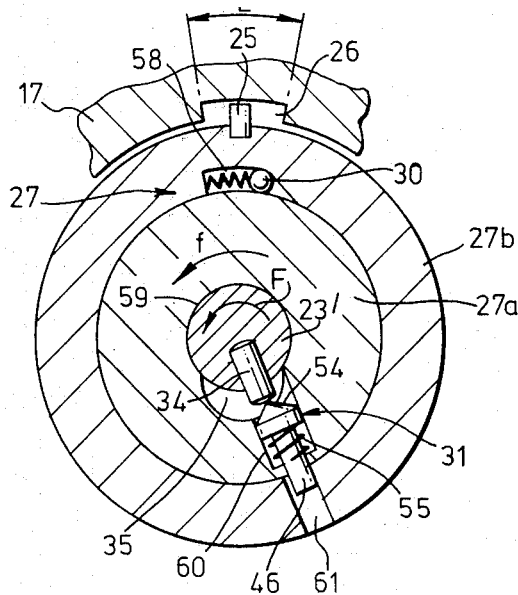
FIG. 2 is a transverse cross sectional view taken along the line II—II of FIG. 1.

In this area projecting radially up to the inner wall of bore 16, actuating nut 20 includes a longitudinal slot 29 which is engaged by a radially rotation-preventing pin 28 located in leg 13. Thus, a rotation of actuating nut 20 is prevented without inhibiting its axial slidability. At the end portion of actuating spindle 19 remote from wall 40, a one-way clutch 27 is provided, as illustrated in FIGS. 1 and 2, including an inner disc 27a and an outer ring 27b located thereon concentrically turnable. Ring 27b is held in the axial direction between the adjacent end surface of actuating nut 20 and a flange 57 on disc 27a.

Provided between the outer periphery of inner disc 27a and an inner recess 58 in outer ring 27b is a ball-locking mechanism 30, which acts due to the inclination provided in one end wall of recess 58 in such a manner that disc 27a is allowed to turn relative to ring 27b in the direction of the arrow f, but not in the opposite direction, since ball-locking mechanism 30 will then connect disc 27a and ring 27b locked to each other against rotational movement.

A nose 25 extends radially outward from the outer periphery of ring 27b into a recess 26 in the inner wall of brake piston 17. Apart from the space for accommodating nose 25, recess 26 has a length L in the circumferential direction which corresponds to the nominal brake pad clearance. In the axial direction recess 26 extends over a distance corresponding to the maximum adjusting length (allowable brake pad wear).

Disc 27a has an axial bore 59 in alignment with the axial bore 24 in spindle 19, but which has a somewhat greater diameter than bore 24.

An actuating rod 23 extends through axial bore 24 to the outside of the end of actuating pivot 42. That portion of actuating rod 23 outside pivot 42 carries a thread and a nut 33 is screwed thereon. At the absolute end portion of rod 23, a square end 70 is provided to enable a turning tool to grip rod 23.

Adjacent brake disc 37, actuating rod 23 is provided with a cylindrical stepped extension 23' and then with another flange-like extension 23".

Extension 23' engages a bore 59 in disc 27a and is pivoted there and flange 23" extends behind disc 27a which is essential for the operation of the device.

A radial peg 34 extends radially from extension 23' into a recess 35 at the inner periphery of disc 27a (FIGS. 2 and 2a), peg 34 preferably being disposed approximately diametrically opposite to the ball-locking mechanism 30.

Located at the end portion of recess 35 situated in the direction of the arrow F in FIG. 2 is a rotation-locking mechanism 31 comprising a locking pivot 46 with a cone-shaped inner end portion or tip 54, pivot 46 being disposed radially movable in a radial bore 60 of disc 27a and is biased in the direction of extension 23' by means of a compression spring 55. In FIG. 2, radial bore 60 in disc 27a is aligned with another radial bore 61, in ring 27b. Peg 34 pushes locking pin 46 into bore 61 via cone-shaped tip 54 in the resetting position illustrated in FIG. 2, so that the parts 27a and 27b of one-way clutch 27 are interconnected to prevent relative rotation therebetween in both directions.

If, however, peg 34 is out of engagement with cone-shaped tip 54 due to a slight clockwise rotary motion of extension 23' relative to disc 27a, spring 55 forces locking pivot 46 out of radial bore 61 so that only ball-locking mechanism 30 determines whether parts 27a and 27b move relative to each other.

Figure 2A:
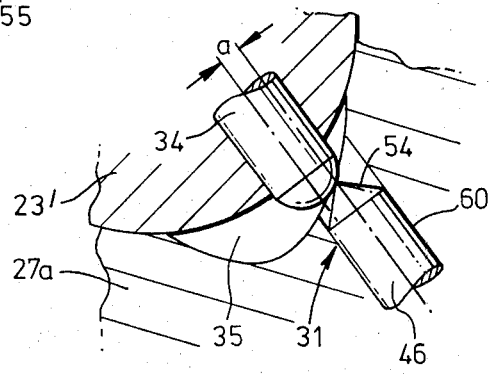
FIG. 2a is an enlarged detail of FIG. 2.

To cause locking pivot 46 to withdraw automatically from radial bore 61 after a resetting of the adjustment device, according to FIG. 2a, a displacement "a" in the circumferential direction is provided in the resetting position between the rounded tip of peg 34 and the cone-shaped tip 54 of locking pivot 46 such that spring 55 exerts a restoring torque opposite to the torque applied by actuating rod 23 as indicated by arrow F.

The mode of operation of the fist-type caliper brake described above is as follows. To make the brake ready for operation after a resetting of the adjusting device, first of all peg 34 is urged out of engagement with tip 54 by turning actuating rod 23 from the position illustrated in FIGS. 2 and 2a opposite to the direction of arrow F, so that spring 55 releases the connection between disc 27a and ring 27b locked to each other to prevent relative rotational movement. This turning back from the position illustrated in FIGS. 2 and 2a occurs automatically when displacement "a" is present. Nut 33 is tightened now, resulting in flange 23" pushing inner disc 27a of one-way clutch 27 against the adjacent end surface of actuating spindle 19. Due to the friction contact between disc 27a and the adjacent end surface of actuating spindle 19, these two parts will now be connected to prevent relative rotation therebetween.

If the actuating lever 43 is not swivelled in the direction of arrow f in FIG. 2, actuating nut 20 will be displaced thereby in the direction of brake disc 37 on account of threads 22a and 22b being designed as right-hand threads. When this occurs, annular brake piston 17 will also be entrained through threads 21a and 21b. Brake shoes 14 and 15 will now abut brake disc 37.

Referring to FIG. 2, radial nose 25 will move from the right-hand end portion of recess 26 up to its left-hand end portion during a clamping or braking movement in the range of the nominal brake pad clearance. During this movement outer part 27b is entrained by the inner part 27a by a certain friction between these parts or within ball-locking mechanism 30.

However, if the nominal brake pad clearance L is exceeded, as a result of the brake pads being worn, nose 25 will abut the left-hand end of recess 26 at the end of the clearance L and a relative movement between the parts 27a and 27b will be caused by the effect of one-way clutch 27 from there on.

After the brake has been released and while actuating spindle 19 and, thus, the parts 27a and 27b are turning back opposite to arrow f, nose 25 will abut the right-hand end portion of recess 26 before actuating lever 43 abuts its stop 56 again. Since one-way clutch 27 is now locked on account of ball-locking mechanism 30 (parts 27a and 27b prevented from having relative rotation with respect to each other), nose 25 causes piston 17 to execute a rotary motion in this final stage of the adjusting movement, the rotary motion being clockwise in FIG. 2. Since threads 21a and 21b are designed as a right-hand thread, piston 17 will be screwed out of bore 16. Thus, the nominal brake pad clearance is re-established, if necessary, in several adjusting steps.

Piston 17 must be reset to its initial position to enable replacement of worn brake pads. This resetting is achieved simply by loosening screw 33 and turning actuating rod 23 by means of a turning tool applied to square end 70 in the direction of arrow F in FIG. 2. When this occurs, peg 34 will first move to the portion of recess 35 in which cone-shaped tip 54 of locking pin 46 is located. Peg 34 will engage cone-shaped tip 54 and exert a force on locking pin 46 which is directed radially outward. At the same time, disc 27a will rotate in the direction of arrow F until bores 60 and 61 are in alignment. At this moment, peg 34 will continue to slide up the cone of tip 54 and, in doing so, will push locking pin 46 against the force of spring 55 into outer radial bore 61. From then on, the parts 27a and 27b are connected to prevent relative motion therebetween. A further rotary motion of actuating rod 23 in the direction of arrow F will cause via radial nose 25 abutting the left-hand end portion of recess 26, brake piston 17 to be turned, whereby piston 17 will be able to be turned back to its initial position. After having attained the initial position of piston 17, a slight rotation of actuating rod 23 opposite to arrow F takes place after the turning tool has been removed from square end 70, due to tip 54 whereupon locking pin 46 will leave bore 61. Nut 33 is then tightened and the brake is once more ready for operation.

Additionally, a bellows-like sealing diaphragm 48 extends between the end of the outer surface of brake piston 17 adjacent brake disc 37 and leg 13, sealing diaphragm 48 being located—in accordance with the present invention—turnable relative to piston 17 in an indentation 49 formed in piston 17 and which is confined adjacent brake piston 37 by means of a retainer spring 50. However, a certain friction between diaphragm 48 and piston 17 is useful in order to prevent, for example, accidental torsions of piston 17 due to vibrations. Consequently, diaphragm 48 stabilizes brake piston 17 in the position obtained after an adjustment without impairing the adjustment itself. In addition, it is important that the amount of friction force within the threads 21a and 21b is greater than the amount of friction force of threads 22a and 22b for causing a rotation between the components 19 and 20 and not between the components 17 and 20 when the brake is operated.

Figure 3:
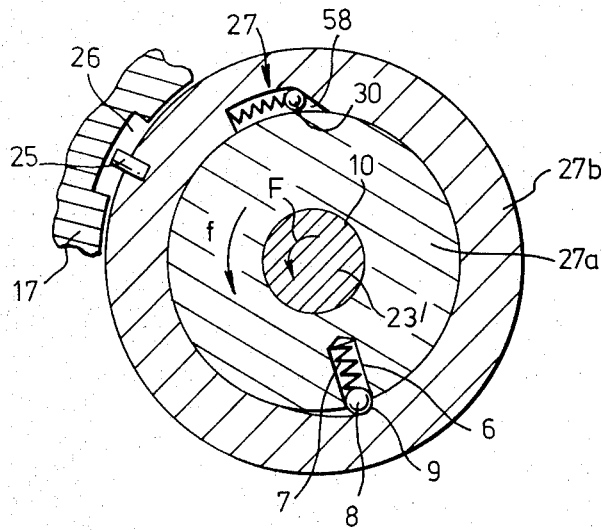
FIG. 3 is a transverse cross sectional view of a simplified modification of FIG. 2.

According to FIG. 3, extension 23' and part 27a are interconnected in the position designated with reference to numeral 10 to prevent relative motion therebetween by means of a press fit or due to being constructed as one piece. Provided between the parts 27a and 27b of one-way clutch 27 is a one-way click device including a radial bore 6 in part 27a, a click ball 8 disposed in bore 6 and subjected to radial outward force by a spring 7, and a click indentation 9 incorporated in the inner periphery of part 27b, indentation 9 extending so steeply in the direction of arrow F that click ball 8 entrains part 27b and piston 17 over the steep slope portion of click indentation 9 after nut 33 has been unscrewed and actuating rod 23 has turned back. During normal braking operaton, after having tightened nut 33, click ball 8 is allowed to move freely out of click indentation 9 as soon as the nominal brake pad clearance is exceeded, in particular, due to a correspondingly flattened slope portion of indentation 9.

To avoid collision of ball-locking device 30 and the ball one-way click device 6, 7, 8 and 9 upon radial alignment, these two devices are staggered axially with respect to each other.

Instead of piston 17 being turnable within the cylinder bore 16, a type of piston may be used in accordance with the present invention that is only axially movable, but not turnable. In this embodiment an adjusting nut is arranged within the piston turnable relative thereto but axially not movable, the adjusting nut carrying on its inner surface adjusting thread 21a which cooperates with external thread 21b of actuating nut 20. In this case, recess 26 with which radial nose 25 engages would have to be disposed in the adjusting nut. This design offers the advantage that no rotation-slide connection is required between sealing diaphragm 48 and piston 17. In addition, the adjusting nut can be constructed to have a short axial length with the length of adjusting thread 21b being correspondingly longer.

While I have described above the principles of my invention in connection with specific apparatus, it is to be clearly understood that this description is made only by way of example and not as a limitation to the scope of my invention as set forth in the objects thereof and in the accompanying claims.

I claim:
1. A mechanical actuating device for a spot-type disc brake comprising:
a brake caliper embracing the periphery of a brake disc, one leg of said caliper having a cylindrical bore therein, said bore having a longitudinal axis parallel to an axis of rotation of said brake disc;
a hollow cylindrical brake piston disposed in said cylindrical bore coaxial of said longitudinal axis, said brake piston being rotatable in said cylindrical bore, acting upon one brake shoe of said disc brake, and having a first thread disposed on the inner surface thereof;
an actuating nut secured against rotation disposed within said brake piston coaxial of said longitudinal axis, said actuating nut having a second thread on at least a portion of its outer surface engaging said first thread;
an actuating spindle disposed within said actuating nut coaxial of said longitudinal axis, said actuating spindle cooperating with said actuating nut to advance said brake piston toward said brake disc upon a relative axial displacement between said actuating spindle and said actuating nut caused by said actuating spindle being rotated by an actuating means coupled thereto; and
an automatic brake pad clearance adjusting device disposed in said brake piston coaxial of said longitudinal axis including
a one-way clutch disposed to act between said brake piston and said actuating spindle to enable maintaining a nominal brake pad clearance with respect to said brake disc by moving said brake piston out of said cylindrical bore when said actuating spindle is returning to its rest position after a brake actuation, said one-way clutch being connected to said actuating spindle during brake operation with this connection being capable of being removed to enable said one-way clutch to rotate independently of said actuating spindle.

2. An actuating device according to claim 1, wherein said one-way clutch does not entrain said brake piston in either direction of rotation when said one-way clutch is rotated an amount corresponding to said nominal clearance during a brake actuation, and
said one-way clutch is rotated relative to said actuating spindle opposite to the actuating direction of rotation when said nominal clearance is exceeded during a brake actuation an amount corresponding to the amount said nominal clearance has been exceeded, said one-way clutch causing said brake piston to rotate accordingly when said actuating spindle returns to its rest position.

3. An actuating device according to claim 1 or 2, wherein
said one-way clutch is disposed between said one brake shoe and one end of said actuating spindle.

4. An actuating device according to claim 3, wherein
said one-way clutch includes a radially extending nose engaging a circumferential recess in the inner surface of said brake piston, said recess having a circumferential length corresponding to said nominal clearance.

5. An actuating device according to claim 4, wherein
said one-way clutch includes an inner part connected to said one end of said actuating spindle to prevent relative rotation therebetween and an outer part encircling said inner part carrying said nose on the periphery thereof rotatable relative to said outer part during a brake pad clearance adjustment.

6. An actuating device according to claim 5, wherein
said inner part is a disc connected to said one end of said actuating spindle.

7. An actuating device according to claim 6, wherein
said outer part is a ring disposed rotatably on said disc.

8. An actuating device according to claim 7, further including
a ball-locking mechanism disposed between said disc and said ring.

9. An actuating device according to claim 5, further including
a ball-locking mechanism disposed between said inner and outer parts.

10. An actuating device according to claim 9, wherein
said inner part is clamped to said one end of said actuating spindle.

11. An actuating device according to claim 10, wherein
said actuating spindle includes an axial bore therethrough through which an actuating rod extends from the outside of said leg to said one-way clutch.

12. An actuating device according to claim 11, wherein
said actuating rod clamps said one-way clutch to said one end of said actuating spindle and is also employed to disconnect said one-way clutch from said one end of said actuating spindle.

13. An actuating device according to claim 12, wherein
said actuating rod includes an end portion thereof remote from said brake disc having a thread thereon to receive a nut which when tightened against the other end of said actuating spindle exerts an axial clamping force on said one-way clutch.

14. An actuating device according to claim 13, wherein
said actuating rod clamps said inner part to said one end of said actuating spindle to prevent relative motion therebetween.

15. An actuating device according to claim 14, wherein
said one-way clutch is further prevented from rotating relative to said actuating spindle by a friction contact between said one-way clutch and said one end of said actuating spindle.

16. An actuating device according to claim 15, wherein
said one-way clutch includes first means to connect said inner part to said outer part to prevent relative rotation therebetween.

17. An actuating device according to claim 16, wherein
said first means is actuated by a second means connecting said actuating rod to said inner part to prevent relative rotation therebetween.

18. An actuating device according to claim 17, wherein
said second means includes a peg extending radially from said actuating rod to engage a circumferential recess in the inner surface of said first part, said peg acting on said first means in the form of a rotation-locking device in the adjusting direction of rotation.

19. An actuating device according to claim 18, wherein
said rotation-locking device includes a locking pin having a cone-shaped tip facing said actuating rod, said locking pin being radially shiftable in said inner part into a radial bore in said outer part against a spring force when said peg acts on said tip.

20. An actuating device according to claim 19, wherein
said tip and the adjacent end of said peg are cooperatively shaped such that said spring force causes an automatic release of said rotation-locking device after the force resetting said brake piston is removed.

21. An actuating device according to claim 13, wherein
said actuating rod is permanently connected to said inner part, and
a one-way click device is disposed between said inner part and said outer part to cause said inner part to entrain said outer part during a resetting operation of said brake piston but does not inhibit relative rotation of said inner and outer parts during normal braking.

22. An actuating device according to claims 1 or 2, wherein
said actuating spindle is supported by a bearing disposed between an end of said actuating spindle remote from said brake disc and an end wall of said cylindrical bore remote from said brake disc.

23. An actuating device according to claim 1 or 2, wherein
said actuating spindle and said actuating nut are cooperatively interconnected by a ball bearing thread disposed on the inner surface of said actuating nut and the outer surface of said actuating spindle.

24. An actuating device according to claim 1 or 2, wherein said one-way clutch is clamped to one end of said actuating spindle adjacent said brake disc.

25. An actuating device according to claim 24, wherein said actuating spindle includes an axial bore therethrough through which an actuating rod extends from the outside of said leg to said one-way clutch.

26. An actuating device according to claim 25, wherein said actuating rod clamps said one-way clutch to said one end of said actuating spindle and is also employed to disconnect said one-way clutch from said one end of said actuating spindle.

27. An actuating device according to claim 26, wherein said actuating rod includes an end portion thereof remote from said brake disc having a thread thereon to receive a nut which when tightened against the other end of said actuating spindle exerts an axial clamping force on said one-way clutch.

* * * * *